Aug. 16, 1938.　　　A. E. SCHAWLEM　　　2,126,819
TRACTOR AND TRAILER CONSTRUCTION
Filed April 4, 1936　　　2 Sheets-Sheet 2
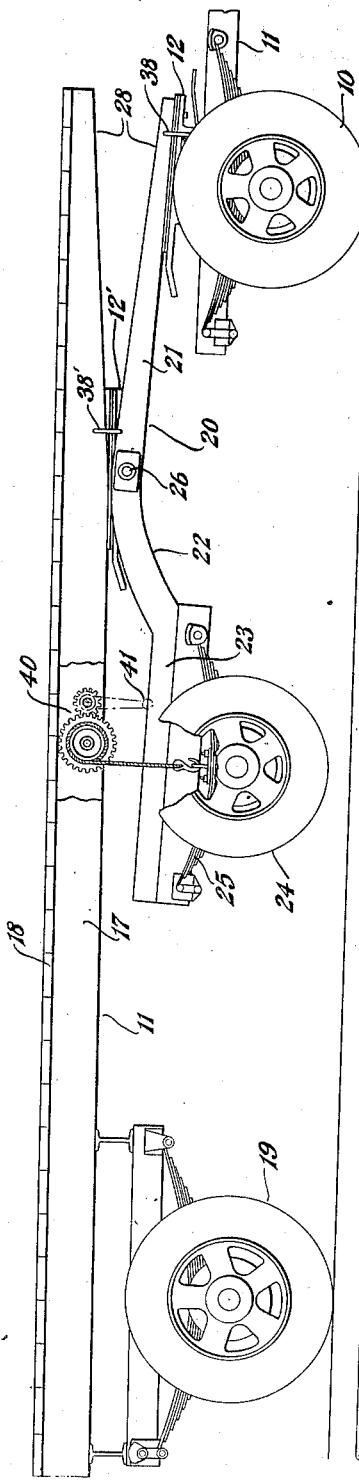
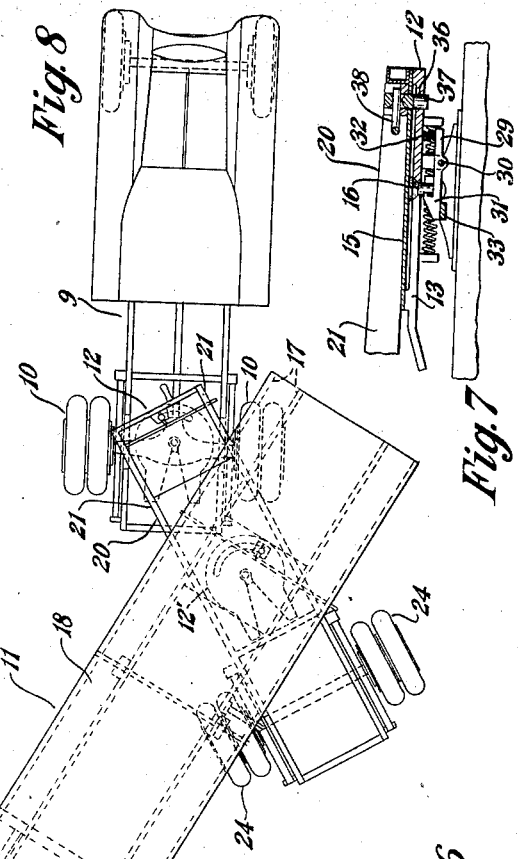
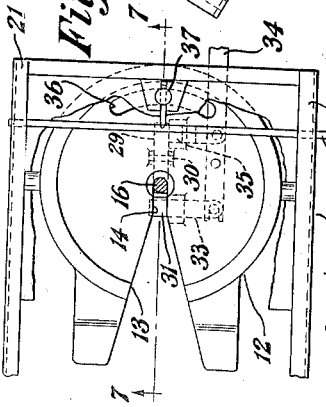
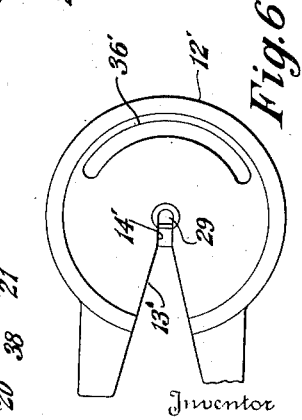
Inventor
Albert E. Schawlem
By Frease and Bishop
Attorneys Patented Aug. 16, 1938

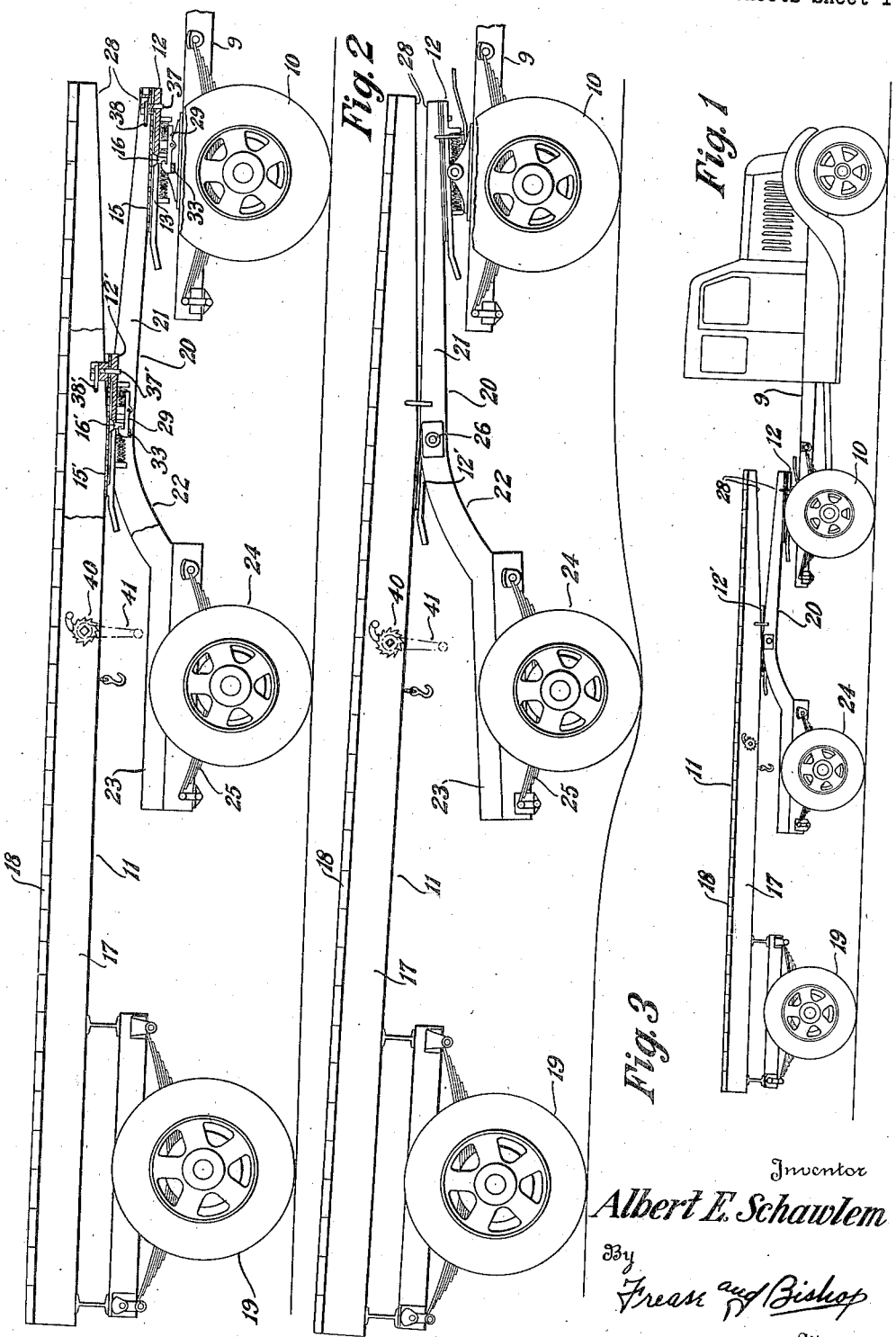

2,126,819

UNITED STATES PATENT OFFICE 2,126,819

TRACTOR AND TRAILER CONSTRUCTION

Albert E. Schawlem, Canton, Ohio

Application April 4, 1936, Serial No. 72,760

4 Claims. (Cl. 280—33.1)

The invention relates to tractor and trailer constructions for carrying heavy loads, and more particularly to a construction for distributing the load carried by the trailer whereby the total capacity of the trailer is increased without exceeding prescribed limits as to the load carried by each set of trailer wheels, and as to over-all length.

With the common types of trailers or semi-trailers, the maximum allowed load per set of wheels is limited by law to a certain amount which varies according to localities or States, making the total capacity of the trailers equal to the allowed load per set of wheels multiplied by the number of sets of wheels.

A semi-trailer is usually defined as being a vehicle having part of its weight supported by another vehicle, and it is customary to have a semi-trailer connected to the truck or tractor by means of a fifth wheel, and where increased load capacity is desired a four wheel trailer is sometimes connected to the rear end of the semi-trailer.

The addition of a four wheel trailer to the rear of a semi-trailer increases the total load capacity, but lengthens the train, making it harder to pull and manipulate, and rendering it practically impossible to back the train satisfactorily.

Moreover, such a long train involves increased danger in driving due to the remoteness of the four wheeled trailer from the driver, and due to its tendency to weave or swing laterally on the road. Furthermore, the use of the additional four wheel trailer involves extra time and labor in loading and in coupling and uncoupling the trailer to and from the semi-trailer.

In some States the maximum allowable train length of a tractor and trailer arrangement is such that the use of a four wheel trailer with a semi-trailer of any substantial length, is practically prohibited.

Another way to increase the load capacity of the old type semi-trailer is to use a tandem axle arrangement, which involves adding an axle and set of wheels in front of and closely adjacent to the rear axle of the semi-trailer.

In many States, this arrangement increases the allowable load only to the extent of the weight of the extra axle and wheels. Moreover, the tandem arrangement causes scuffing or wear of the tires on curves, and requires excessive driving power, because the wheels will not track or turn properly around the curves and must be slid.

It is therefore an object of the present invention to provide an improved tractor and trailer construction having greatly increased total load capacity without exceeding the load limit for each set of wheels.

Another object is to provide improved tractor and trailer construction having increased load capacity without requiring an additional four wheel trailer.

Another object is to provide tractor and trailer construction of increased load capacity which can be manipulated and backed easily, and requires a minimum of driving power.

A further object is to provide tractor and trailer construction, the wheels of which are adapted to turn curves properly, and which construction is especially safe to drive.

A still further object is to provide an improved tractor and trailer construction which tends to prevent skidding, and which will actually function to stop the train from sliding backward on a slippery incline.

And finally, it is an object of the present invention to embody all of the foregoing objectives in a rugged and comparatively simple construction having a load carrying platform of standard height.

These and other objects are accomplished by the parts, improvements, arrangements, proportions, and combinations comprising the present invention, which is hereinafter described in detail and defined in the appended claims.

The invention may be stated in general terms as including the provision of an additional set of wheels substantially midway longitudinally of a semi-trailer, said additional set of wheels being pivotally connected to the fifth wheel of the tractor and carrying a predetermined proportion of the trailer load.

Referring to the drawings forming part hereof:

Figure 1 is an elevation on a reduced scale of the present improved construction incorporated in a tractor and semi-trailer arrangement;

Fig. 2 is an enlarged fragmentary elevation showing the semi-trailer and the rear end of the tractor, parts being broken away;

Fig. 3 is a similar view showing the trailer passing over a depression in the roadway;

Fig. 4 is a similar view showing the additional wheels raised out of contact with the ground to facilitate backing the tractor-trailer train;

Fig. 5 is a fragmentary plan sectional view showing the fifth wheel at the connection of the trailer and tractor;

Fig. 6 is a detached plan view of the fifth wheel making the connection between the sub-frame and the trailer frame;

Fig. 7 is a sectional view as on line 7—7, Fig. 5; and

Fig. 8 is a plan view on the same scale as Fig. 1, showing the trailer frame and sub-frame swung in laterally opposite directions relative to the tractor.

Like numerals indicate like parts throughout the drawings.

The various figures in the drawings are somewhat diagrammatic because no attempt has been made to show all of the mechanical and structural details of old and well known parts.

The present invention is shown embodied in a tractor and semi-trailer arrangement including a tractor 9 having rear wheels 10, and a semi-trailer 11.

The rear end of the tractor 10 has mounted thereon a fifth wheel of usual construction indicated generally at 12, and arranged to rock about a horizontal axis.

As best shown in Fig. 5, the fifth wheel 12 is provided with a rearwardly opening guideway 13 terminating in a socket 14, and the upper fifth wheel plate 15 on the trailer is provided with a king pin 16. When the trailer is coupled to the tractor, the king pin 16 enters the guideway 13 and engages the socket 14, forming a pivotal connection about which the trailer can swing horizontally relative to the tractor, and for this purpose the fifth wheel 12 is mounted on the tractor substantially even with the top of the tractor wheels 10 to permit the trailer to swing over the wheels of the tractor.

As thus far described, the fifth wheel connection is of usual and well known construction, and forms no part of the present invention.

The semi-trailer 11 includes a frame 17 supporting a load-carrying platform 18, the frame 17 being supported at its rear end by an axle and set of wheels 19 of usual construction.

In the usual tractor and semi-trailer arrangement, the trailer load is carried by the rear set of wheels 19 and the tractor wheels 10, and it is customary in many States to limit by law the total load carried by the trailer to a certain amount based upon a maximum load for each set of wheels.

Thus, if the trailer 11 were wholly supported by wheels 19 and 10 in the usual manner, and the maximum load for each set of wheels were limited to 9 tons, for example, then the total allowed load for the trailer 11 would be 18 tons.

In the present invention I provide an improved construction whereby the total load or capacity of the trailer is greatly increased without exceeding the maximum load per set of wheels.

A sub-frame 20 is located under the front end of the trailer frame 17, and includes longitudinal members 21 which preferably line up or register with the longitudinal members embodied in trailer frame 17. Preferably, the front end of sub-frame 20 terminates at the front end of trailer frame 17 and has secured across the under side of its longitudinal members 21 the upper fifth wheel plate 15 which carries the king pin 16 for connecting the trailer to the tractor.

Preferably, the sub-frame 20 curves downwardly at 22 toward its rear end 23, which is supported or carried on the roadway by an axle and set of wheels indicated at 24, the usual leaf springs 25 being interposed between the axle and the sub-frame. The length of the sub-frame is such that the wheels 24 are located substantially midway longitudinally of the wheels 10 and 19.

The front end portion of the trailer frame 17 is pivotally mounted on an intermediate portion of the sub-frame 20, preferably by means of a fifth wheel indicated generally at 12'.

The fifth wheel 12' is generally similar in construction to the fifth wheel 12 and is mounted on the sub-frame for rocking movement about a transverse axis 26. The fifth wheel 12' is provided with a rearwardly open guideway 13' terminating in a socket 14' in which the king pin 16' is detachably engaged, and the king pin 16' is carried by an upper fifth wheel plate 15' secured to the trailer frame 17.

By means of this construction, the total trailer load is distributed to all three sets of wheels 10, 24, and 19, wheels 24 carrying a predetermined proportion of the load. If the distance from fifth wheel 12' to wheels 24 is substantially equal to the distance from fifth wheel 12' to wheels 10, as shown in the drawings, wheels 24 will carry substantially the same proportion of the load as wheels 10. Accordingly, if the maximum load per set of wheels is nine tons, the total allowed capacity of the improved construction is twenty-seven tons.

The platform 18 of the trailer must be maintained at a minimum height from the ground in order to keep the center of gravity of the load relatively low and maintain a balanced load on the trailer. Moreover, practically all loading and shipping platforms at freight terminals and warehouses and the like, are of standard height, so that the platform of the trailer should be kept as near as possible to that height.

In order to correspond to the standard height of shipping platforms and at the same time keep the center of gravity as low as possible, the standard height of trailer platforms varies from 44 inches to 52 inches, or in other words, is substantially 4 feet.

Accordingly, it becomes very difficult to mount the sub-frame 20 beneath a trailer frame of standard height with the fifth wheel on the tractor mounted high enough to allow the sub-frame to swing over the tractor wheels, and still provide enough clearance between the front ends of the sub-frame and trailer frame so that the sub-frame can rock sufficiently to allow the additional wheels 24 to ride over depressions and the like in the roadway, as shown in Fig. 3.

It is absolutely essential to provide a clearance of at least 8 inches between the top surface of the fifth wheel 12 on tractor 9 and the under side of front end of trailer frame 17, when the trailer is under full load with all of its wheels on the same level or in the same plane, in order to permit sufficient rocking of sub-frame 20; and this amount of clearance is not present between a tractor and trailer of ordinary construction, in which the trailer platform is of standard height.

I have discovered that by beveling or tapering the longitudinal members 21 of the sub-frame and the corresponding longitudinal members of the trailer frame 17 outwardly away from each other between fifth wheel 12' and their front ends, as shown at 28, and by mounting the fifth wheel 12' substantially entirely below the upper surface of the longitudinal frame members 21, it is possible to obtain a clearance of at least 3 inches between the ends of the trailer frame and sub-frame when under full load with all sets of wheels in the same plane; and still maintain the platform 18 at standard height.

A clearance of 3 inches between the front ends of the sub-frame and trailer frame under full load with all wheels in the same plane, is equivalent to slightly more than the minimum required clearance of 8 inches between the lower fifth wheel and the front end of the trailer frame.

In order to lock the king pins 16 and 16' in their respective sockets 14 and 14' in the fifth wheels, a latch bar 29 is provided. The latch bars 29 are identical in both fifth wheels so that only one will be described.

Referring to Figs. 5 and 7, the latch bar 29 is pivoted on the lower fifth wheel as at 30 and has a lug 31 at its rear end which is adapted to engage behind the king pin 16 and hold the same in its socket.

The front end of the latch bar is urged downwardly by a spring 32 to normally hold the lug 31 in locking position, and when the king pin 16 enters the guideway 13 it slides over the tapered end of lug 31 to depress the same and move in front of the lug, after which the spring 32 returns the lug into locking engagement with the king pin. A locking bar 33 may be provided under the rear end of the latch bar to positively hold the latch bar in locking position.

When it is desired to uncouple the trailer at the fifth wheel a releasing lever 34 operatively connected to locking bar 33 is first moved upwardly as viewed in Fig. 5, to withdraw the locking bar 33 from under the rearward end of the latch bar 29, and further movement of the lever 34 in the same direction will force a cam member 35 connected to lever 34 under the forward end to compress spring 32 and depress the lug 31 and permit the king pin 16 to be withdrawn.

In order to limit the lateral swinging movement of the sub-frame relative to the tractor, the fifth wheel 12 is provided with an arcuate slot 36 in which a stop pin 37 is slidably engaged. The pin 37 is mounted on the sub-frame 20, and may be manually withdrawn from the slot 36 by a lever bar 38 operatively connected thereto.

Similarly, the fifth wheel 12' is provided with an arcuate slot 36' which receives a stop pin 37' operatively connected to a lever bar 38' and mounted on the upper fifth wheel plate 15' secured to the trailer frame 17; for limiting lateral swinging movement of the trailer 11 relative to the sub-frame 20.

Preferably, the length of slot 36 in fifth wheel 12 is such as to permit the sub-frame to swing laterally at an angle of 30° with the tractor, and the length of the slot 36' in fifth wheel 12' is such as to permit the trailer 11 to swing laterally at an angle of 60° to the sub-frame.

By means of this construction, if the improved tractor-trailer train begins to slide backward, as on a slippery hill, the sub-frame will swing laterally in one direction until limited by the slot and pin 36, 37, and the trailer 11 will swing laterally in the opposite direction until limited by the slot and pin 36', 37'. In this position, the sub-frame 20 is at an angle of 30° to the tractor in one direction, and the trailer 11 is at an angle of 30° to the tractor in the other direction, with the result that further sliding of the train is prevented because wheels 19 and 24 are angled with respect to wheels 10, and are angled oppositely to each other.

In the same manner, if any part of the improved tractor-trailer arrangement begins to skid, the sub-frame and trailer frame will assume their oppositely angled positions so as to prevent further skidding.

Moreover the slot and pin stops 36, 37 and 36', 37' absolutely prevent any damage to the tractor or danger to the occupants thereof because of the trailer swinging about the fifth wheel and crashing into the cab of the tractor.

Preferably, a winch arrangement indicated at 40 is provided on the trailer frame 17 for raising the wheels 24 clear of the ground if desired, as shown in Fig. 4. The winch may be manually operated as by the handle 41 or may be connected in suitable manner to the motive power of the tractor.

Raising the wheels 24 clear of the ground facilitates manipulation of the tractor-trailer train, and is especially desirable when backing the same.

If desired, a set of auxiliary wheels may be adjustably mounted in a usual manner on the front end portion of the trailer frame 17, for supporting the front end of the trailer when it is detached from the tractor.

The improved tractor and trailer construction has greatly increased total load capacity without exceeding maximum load limits prescribed for each set of wheels, and without materially increasing the over-all length of the tractor-trailer train.

Also, due to the pivotal mounting of the sub-frame on the tractor and its pivotal connection with the trailer frame, all of the wheels track properly around curves, making for ease of manipulation and minimum wear on the tires, as well as minimizing the driving power required.

Since the over-all length of the train is relatively short, and since the rear wheels and additional wheels of the trailer tend to assume oppositely angled positions during skidding or slipping, the improved construction is extremely safe to drive.

Obviously, modifications can be made in the construction and arrangement of the various parts comprising the present invention, without departing from the scope of the invention as defined in the appended claims.

I claim:

1. In combination with a tractor frame having a fifth wheel mounted thereon for movement about a horizontal axis, a trailer having a frame, a sub-frame under the front end of said frame, a set of wheels supporting the rear end of said trailer frame, means detachably connecting one end of the sub-frame to said fifth wheel for lateral swinging movement, means on said fifth wheel for limiting swinging movement of said sub-frame and for locking said fifth wheel to said sub-frame, a second set of wheels carried on the other end of said sub-frame, a second fifth wheel carried on the sub-frame intermediate its ends for movement about a horizontal axis, means detachably connecting said second fifth wheel to said trailer frame for lateral swinging movement of said sub-frame relative to said trailer frame and with said sub-frame and trailer frame in substantially abutting relation, and means on said second fifth wheel for limiting said swinging movement and for locking said second fifth wheel to said trailer frame.

2. In tractor and trailer construction, a tractor having a fifth wheel mounted thereon for movement about a horizontal axis, a trailer having a frame including longitudinal frame members, a set of wheels carrying the rear end of said frame, a sub-frame under the front end of said trailer frame and including longitudinal frame members corresponding to the longitudinal frame members of the trailer frame, a fifth wheel mounted on the sub-frame intermediate its ends for rocking movement about a horizontal axis, means connecting said sub-frame fifth wheel to said trailer frame, a second set of wheels located intermediate the ends of said trailer and connected to one end of said sub-frame, the other end of said sub-frame being connected to said tractor fifth wheel, and the longitudinal frame members of the sub-frame and trailer frame being tapered outwardly away from each other between the sub-frame fifth wheel and their front ends.

3. In combination with a tractor, a trailer having a frame, a sub-frame under the front end of said frame, a set of wheels supporting the rear end of said trailer frame, means connecting one end of the sub-frame to the tractor for lateral swinging movement relative thereto, a second set of wheels carried on the other end of said sub-frame, means mounting the trailer frame on an intermediate portion of the sub-frame for lateral swinging movement relative thereto, means preventing the sub-frame from swinging laterally beyond a certain angle with the tractor, and means preventing the trailer from swinging laterally relative to the sub-frame beyond a position in which the trailer is at the same angle with the tractor.

4. In combination with a tractor having a set of rear wheels, a trailer having a frame extending forwardly over said tractor, a sub-frame under the front end of said frame, a set of wheels supporting the rear end of said trailer frame, means connecting one end of the sub-frame to the tractor for lateral swinging movement over the tractor rear wheels, a second set of wheels carried on the other end of said sub-frame, and means mounting the trailer frame on an intermediate portion of the sub-frame in substantial abutment therewith for lateral swinging movement relative thereto, the forward ends of said sub-frame and trailer frame being tapered to allow vertical rocking movement therebetween.

ALBERT E. SCHAWLEM.